United States Patent
Shaw et al.

(10) Patent No.: US 10,592,680 B2
(45) Date of Patent: Mar. 17, 2020

(54) DATA ACCESSIBILITY CONTROL

(71) Applicant: ExactTrak Limited, Banbury (GB)

(72) Inventors: Norman Shaw, Banbury (GB); John Pragnell, Banbury (GB)

(73) Assignee: ExactTrak Limited, Banbury (GB)

(*) Notice: Subject to any disclaimer, the term of this patent is extended or adjusted under 35 U.S.C. 154(b) by 0 days.

(21) Appl. No.: 15/035,235

(22) PCT Filed: Oct. 31, 2014

(86) PCT No.: PCT/GB2014/053243
§ 371 (c)(1),
(2) Date: May 9, 2016

(87) PCT Pub. No.: WO2015/067924
PCT Pub. Date: May 14, 2015

(65) Prior Publication Data
US 2016/0292444 A1    Oct. 6, 2016

(30) Foreign Application Priority Data
Nov. 8, 2013   (GB) .................................. 1319744.7

(51) Int. Cl.
*G06F 21/62* (2013.01)
*G06F 16/22* (2019.01)
*G06F 21/10* (2013.01)

(52) U.S. Cl.
CPC ...... *G06F 21/6218* (2013.01); *G06F 16/2272* (2019.01); *G06F 21/10* (2013.01)

(58) Field of Classification Search
None
See application file for complete search history.

(56) References Cited

U.S. PATENT DOCUMENTS

| | | | |
|---|---|---|---|
| 6,775,655 B1 | 8/2004 | Peinado et al. | |
| 7,337,264 B2* | 2/2008 | Iida ....................... | G06F 3/0604 709/213 |
| 7,594,084 B2* | 9/2009 | Ikemoto ................ | G06F 3/0605 711/112 |
| 8,086,585 B1* | 12/2011 | Brashers ........... | G06F 17/30171 707/705 |

(Continued)

FOREIGN PATENT DOCUMENTS

| | | |
|---|---|---|
| WO | WO 98/50843 | 11/1998 |
| WO | WO 2013/048487 | 4/2013 |
| WO | WO 2015/067924 | 5/2015 |

OTHER PUBLICATIONS

Patents Act 1977: Combined Search and Examination Report Under Sections 17 and 18(3) dated May 9, 2016 From the Intellectual Property Office of the United Kingdom of Great Britain Re. Application No. GB1600634.8.

(Continued)

Primary Examiner — Maung T Lwin
Assistant Examiner — Olanrewaju J. Bucknor

(57) ABSTRACT

A computer implemented method and apparatus for controlling the accessibility of data on a data storage 9 comprises obtaining an identifier, and determining dependent on the identifier, in a secure context 5 of a computer processor 1, whether to make data accessible in a user context 3. In the event that data is to be made accessible, access is provided to the data in the user context 3.

16 Claims, 4 Drawing Sheets

(56) References Cited

U.S. PATENT DOCUMENTS

| | | | | |
|---|---|---|---|---|
| 8,510,265 | B1* | 8/2013 | Boone | G06F 17/302 707/609 |
| 8,560,839 | B2* | 10/2013 | Barham | G06F 21/6218 713/156 |
| 8,601,598 | B2* | 12/2013 | Ozzie | H04L 63/0428 380/43 |
| 8,705,746 | B2* | 4/2014 | Meijer | G06F 21/6245 380/279 |
| 8,826,147 | B2* | 9/2014 | Sitrick | G06F 17/241 715/738 |
| 2002/0103970 | A1* | 8/2002 | Gut | G06F 12/0802 711/118 |
| 2002/0194389 | A1* | 12/2002 | Worley, Jr. | G06F 9/4812 719/310 |
| 2004/0250125 | A1 | 12/2004 | Janson et al. | |
| 2005/0066354 | A1 | 3/2005 | Dellow et al. | |
| 2006/0090084 | A1 | 4/2006 | Buer | |
| 2006/0174334 | A1 | 8/2006 | Perlin et al. | |
| 2006/0259487 | A1 | 11/2006 | Havens et al. | |
| 2006/0294370 | A1* | 12/2006 | Greenspan | G06F 21/53 713/164 |
| 2007/0050580 | A1 | 3/2007 | Lewis | |
| 2008/0162784 | A1 | 7/2008 | Obereiner et al. | |
| 2008/0162866 | A1 | 7/2008 | Siddiqi et al. | |
| 2008/0165957 | A1* | 7/2008 | Kandasamy | G06F 21/6218 380/44 |
| 2009/0240923 | A1* | 9/2009 | Covey | G06F 9/30167 712/220 |
| 2009/0316889 | A1 | 12/2009 | Macdonald et al. | |
| 2009/0327635 | A1* | 12/2009 | Iyengar | G06F 21/10 711/163 |
| 2010/0024016 | A1 | 1/2010 | Violleau et al. | |
| 2010/0138388 | A1* | 6/2010 | Wakeling | G06F 17/30569 707/634 |
| 2010/0191779 | A1* | 7/2010 | Hinrichs | G06F 3/0605 707/822 |
| 2010/0235598 | A1 | 9/2010 | Bouvier | |
| 2010/0250626 | A1* | 9/2010 | Takaoka | G06F 17/302 707/812 |
| 2010/0325736 | A1* | 12/2010 | Sadovsky | H04L 9/32 726/27 |
| 2011/0047387 | A1 | 2/2011 | Gover | |
| 2011/0258397 | A1 | 10/2011 | Gauteron et al. | |
| 2011/0307724 | A1* | 12/2011 | Shaw | G06F 21/305 713/323 |
| 2013/0047251 | A1 | 2/2013 | Radhakrishnan et al. | |
| 2013/0097698 | A1* | 4/2013 | Taveau | G06Q 30/06 726/19 |
| 2013/0275306 | A1 | 10/2013 | Ignatchenko et al. | |
| 2013/0332700 | A1* | 12/2013 | Kopylovitz | G06F 3/0604 711/209 |
| 2014/0033297 | A1* | 1/2014 | Beals | G06F 21/51 726/16 |
| 2015/0052325 | A1* | 2/2015 | Persson | G06F 12/1433 711/163 |
| 2016/0359921 | A1* | 12/2016 | Li | G06F 21/62 |

OTHER PUBLICATIONS

International Search Report and the Written Opinion dated Apr. 9, 2015 From the International Searching Authority Re. Application No. PCT/GB2014/053243.

Patents Act 1977: Further Search Report Under Section 17(6) dated Aug. 27, 2014 From the Intellectual Property Office of the United Kingdom of Great Britain Re. Application No. GB1319744.7.

Patents Act 1977: Search Report Under Section 17(5) dated Apr. 14, 2014 From the Intellectual Property Office of the United Kingdom of Great Britain Re. Application No. GB1319744.7.

Alves et al. "TrustZone: Integrated Hardware and Software Security—Enabling Trusted Computing Embedded Systems", ARM White Paper, XP002412574, p. 1-13, Jul. 2004.

ARM "ARM Security Technology—Building A Secure System Using TrustZone Technology", ARM Limited, XP002660015, p. I-XII, 1, Apr. 30, 2009. Para [6.2.1].

* cited by examiner

DATA ACCESSIBILITY CONTROL

RELATED APPLICATIONS

This application is a National Phase of PCT Patent Application No. PCT/GB2014/053243 having International filing date of Oct. 31, 2014, which claims the benefit of priority of United Kingdom Patent Application No. 1319744.7 filed on Nov. 8, 2013. The contents of the above applications are all incorporated by reference as if fully set forth herein in their entirety.

FIELD AND BACKGROUND OF THE INVENTION

The present invention relates to a method and apparatus for controlling the accessibility of data, more particularly the invention relates to processors and data storage devices.

Bring your own device (BYOD) is becoming a frequently used method of allowing employees to operate, whereby employees bring their own portable device (e.g. laptop computer) to their workplace to work on.

However, as result of their small physical size, laptop computers and other portable devices may easily be misplaced or stolen. In recent and highly publicised examples the loss of highly sensitive or valuable information on portable devices has been shown to be damaging both to organizations and to governments.

It is therefore desirable to securely hold and make safe from tampering data on portable devices. This is beneficial for both organizations and governments who do not want highly sensitive or valuable information to be lost or misplaced, and also to employees who do not want their employer having access to their personal data.

SUMMARY OF THE INVENTION

Computer implemented methods and apparatuses are disclosed, in which, where a computer is operated in a particular location (for example a user's work location) by a particular user at a particular time, then a selection of data is made accessible, but when the computer system is operated away from that particular location, or by a different user, or at a different time (for example at the weekend), then a different selection of data is made accessible. The selection of data that is made accessible can be controlled by selecting a map of data storage, such as a file allocation table, based on pieces of information such as the location of the computer system, the user and the time.

Accordingly, an aspect provides a method of controlling the accessibility of data to a computer processor configured to context switch between a user context and a secure context, the method comprising:
 obtaining an identifier;
  determining, dependent on the identifier, in the secure context, whether to make data accessible in the user context; and,
  in the event that it is determined to make data accessible, providing access to the data in the user context.

The determination, dependent on the identifier, may comprise passing the identifier to a security controller operating in the secure context of the computer processor, and the security controller determining dependent on the identifier, in the secure context, whether to make data accessible in the user context.

Making data accessible may comprise controlling a map of data storage. The map of the data storage may comprise an association between file names and storage addresses. The storage addresses may comprise information about the storage address of clusters or groups of data stored on the data storage. The storage address may comprise information about the physical location of information on the data storage. The map of the data storage may comprise at least one of a file allocation table, metafile data in a master file table, a master directory block, a volume bitmap, a catalog file, a resource fork, a volume header or an allocation file. Controlling a map of the data storage may comprise obtaining a map of the data storage. Controlling a map of the data storage may comprise selecting a map among a subset of predetermined maps. Controlling a map of the data storage may comprise constructing a map. Construction of the map may be based on the identifier. Controlling the map of the data storage may comprise changing the directory structure of the data storage.

The security controller may perform the context switching. The security controller may be configured to operate in a secure application environment, separate from an operating system (for example, an operating system used to support user applications which access the data from the user context). The secure context may provide a secure application environment, for example to enable a decryption application to operate outside the control of the operating system. The data to be made accessible may be selected in the secure context.

An aspect provides a method of controlling the accessibility of data recorded by a computer configured to context switch between a user context and a secure context, the method comprising:
 receiving data in the user context;
 obtaining an identifier;
 determining dependent on the identifier, in the secure context, whether data is to be recorded to a data storage according to a first map or a second map.

Receiving data in the user context may comprise the computer processor receiving data from another component of the computer system. For example, receiving data in the user context may comprise receiving data from a remote device or a peripheral. Receiving data may comprise creating data, for example by operation of the operating system and/or user applications. Determining whether data is to be recorded to a data storage may comprise recording data to a data storage. Recording data to a data storage may comprise creating a map. Recording data to a data storage may comprise encrypting data.

Obtaining the identifier may comprise obtaining the identifier in the user context and passing the identifier from the user context to the secure context. Obtaining the identifier may comprise obtaining the identifier in the secure context. The identifier may be verified in the secure context.

The secure context may be provided by TrustZone®. TrustZone® may enable the delivery of platforms capable of supporting full Trusted Execution Environments (TEE), for example a secure kernel, separate from the kernel used by the user's operating system, capable of supporting security aware applications and secure services, or Trusted Applications (TA). TrustZone® may enable the operation of a separate user Operating System and TEE by creating a secure context and a user context. The secure context may operate in a separate memory space to the user context. The separate memory space may be a partition of virtual memory.

The TrustZone® architecture may enable any part of a computer system to be made secure, enabling an end-to-end security solution that includes functional units and the debug infrastructure. Security protocols can be built on top of the TrustZone® architecture, such as secure boot and authenticated debug enable. The TrustZone® architecture may further allow a single physical processor core to execute code from both a user context and a secure context in a time-sliced fashion. This may remove the need for a dedicated security processor core, which saves silicon area and power, and allows high performance security software to run alongside the user context operating environment. In some examples the processor of the present disclosure comprises a dedicated security core.

There are many possible software architectures that TrustZone® can enable. The most complex is a dedicated secure context operating system; the simplest is a synchronous library of code placed in the secure context.

TrustZone® may also allow the processor memory management unit (MMU) to separate the secure context memory space into multiple-user sandboxes. Provided that the secure context kernel software is correctly implemented, security tasks from independent processes (for example, different applications) can execute at the same time without needing to trust each other. The TEE kernel may enforce the logical isolation of processes executing in the secure context from each other, preventing one secure task from reading or writing data onto the memory space of another.

The processor may have a core configured to provide a secure context virtual core associated with the secure context and a user context virtual core associated with the user context. The secure context may operate within the secure context virtual core, and the user context may operate within the user context virtual core. When the secure context and user context are operating, they are performing the functions of the processor.

Hardware and/or software resources may be partitioned between the secure context and the user context. The secure context and the user context may operate in different partitions of virtual memory. All hardware and/or software resources may be available to the secure context, but limited hardware and/or software resources may be available to the user context. The identifier may be obtained in the secure context. The processor may be configured to operate in the two contexts by way of a (micro) kernel. The (micro) kernel may be configured to boot before user applications and/or an operating system of the user context boots.

The security controller may be a monitor mode operating within the secure context virtual core. The mode may be an operating system context switch. The mode may provide the interface between the secure context and the user context. The mode may context switch resources that are needed in both a secure context and the user context.

The security controller may be configured to operate in a secure application environment, separate from an operating system. The secure context may provide a secure application environment.

An aspect provides a method of controlling the accessibility of data to a computer processor, the method comprising:
  obtaining an identifier;
  passing the identifier to a security controller operating in the computer processor;
  the security controller determining dependent on the identifier, whether to make data accessible; and
  dependent on the determination of the identifier, the security controller controlling the accessibility of data on a data storage coupled to the processor by controlling a map of the data storage.

Providing access to the data may comprise decrypting the data and making the decrypted data accessible.

Making the decrypted data accessible in the user context may comprise storing the decrypted data in data storage that is readable by the processor operating in the user context. The data storage may comprise RAM or an on-chip cache, or may comprise a non-volatile storage such as FLASH EEPROM and HDD.

The accessibility of the data may be controlled by only providing accessibility to data that is decrypted or unencrypted. Data may be decrypted dependent on the identifier.

Selecting data may comprise selecting a map of data storage from at least two stored maps. Selecting a map of data storage may comprise selecting more than one map of data storage.

The method of any one aspect may comprise sending a first network message based on the identifier from the processor operating in the secure context to a remote device, wherein determining dependent on the identifier comprises determining based on a second network message received from the remote device.

The identifier may comprise at least one of: time information, GPS information, host computer information, a MAC address, an IP address, a wireless network ID, SSID, GSM cell, GSM data, a user identifier indicating a user currently operating the host computer, and one or more unique identifiers to prevent spoofing or false reporting from the host computer.

A weighting may be applied to the identifier dependent on the source of the identifier, the weighted identifier being used to determine the accessibility of the data. The weighting may be configurable by a user. Dependent on the weighted identifier, all data, only some data, or no data may be made accessible. The weighting may be determined by a lookup table indicating the weighting to apply to an identifier based on its source. The weighting may be determined by a server.

An aspect provides a computer processor configured to control the accessibility of data on a non-volatile data storage, and to context switch between a user context and a secure context configured to control access of the user context to data stored on the data storage; wherein
  the processor comprises a security controller configured to control, in the secure context, the accessibility of data stored on the data storage in the user context, dependent on an identifier.

The secure context may provide secure access to data on the data storage by encryption. The security controller may control the accessibility of data by controlling a map of the data storage. The security controller may control the accessibility of data by selecting data to be made accessible based on the identifier and decrypting the selected data in the secure context, wherein selecting data comprises selecting a map of the data storage from at least two stored maps. Selecting data may comprise selecting a map of data storage from at least two stored maps.

The data may be selected in the secure context. The identifier may be verified in the secure context.

The security controller may control the context switching between the secure context and the user context.

An aspect provides a computer readable non-transitory storage medium comprising a program for a computer configured to cause a processor to perform any one method described herein.

An aspect provides a computer readable data carrier comprising a program for a computer configured to cause a processor to perform any one method described herein.

An aspect provides a computer system comprising a data storage and a processor as described herein, or a processor configured with the programs as described herein.

An aspect provides a tablet comprising a data storage and a processor as described herein, or a processor configured with a program as described herein.

An aspect provides a mobile phone comprising a data storage and a processor as described herein, or a processor configured with a program as described herein.

The computer system, tablet or mobile phone may comprise means to communicate over a network including a wireless network, means to communicate over a GSM network, and means to obtain a position by GPS.

BRIEF DESCRIPTION OF THE SEVERAL VIEWS OF THE DRAWINGS

Embodiments will now be described, by way of example only, with reference to the accompanying drawings, in which.

DESCRIPTION OF SPECIFIC EMBODIMENTS OF THE INVENTION

Figure 1:
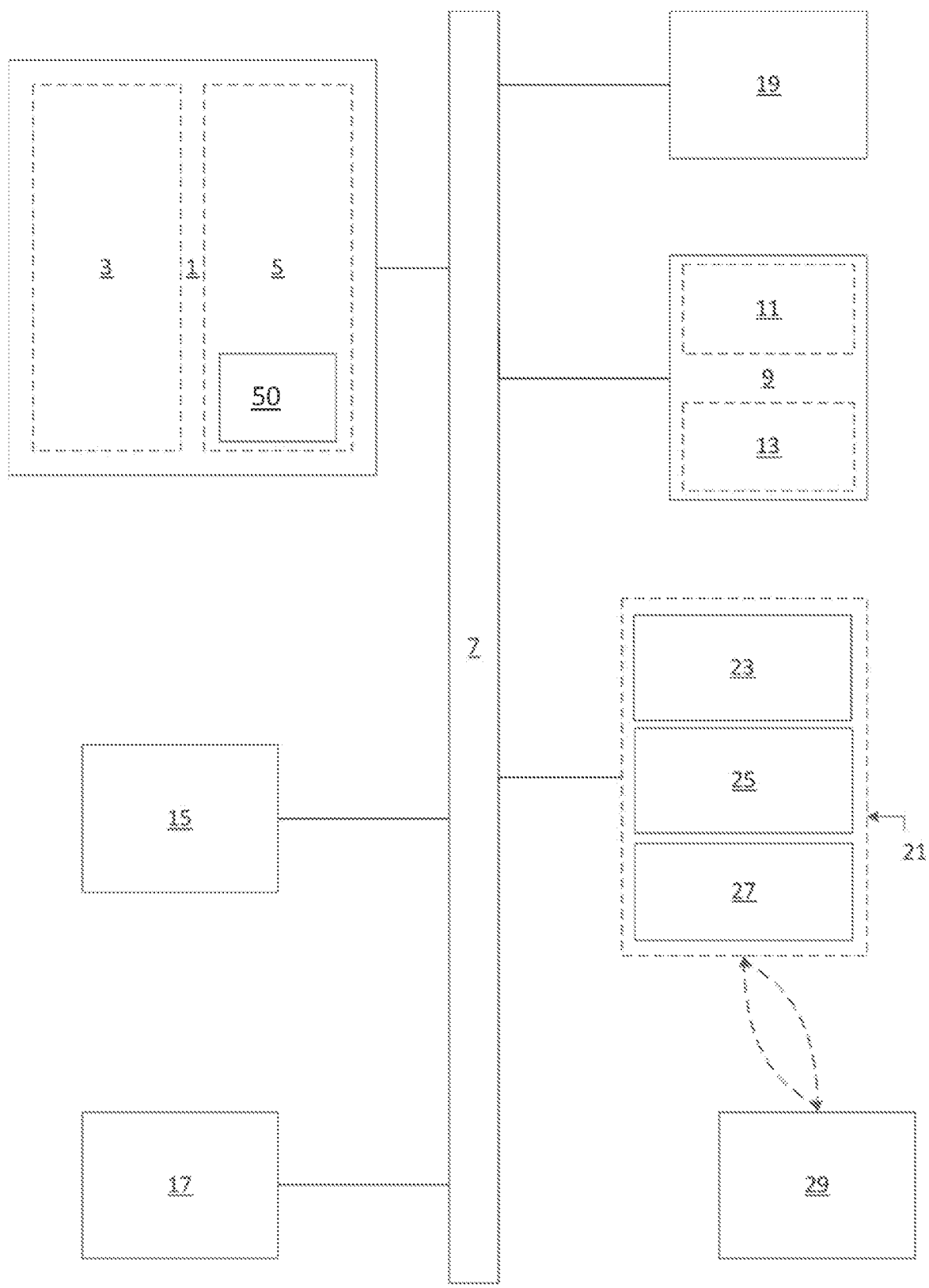
FIG. 1 shows a schematic of an example embodiment of a computer system.

A computer system configured to perform a method of controlling the accessibility of data to a computer processor is shown in FIG. 1. The method allows the system to control the accessibility of data based on an identifier which may provide information such as the location of the computer system, the user and the time.

The computer system comprises a processor 1 coupled to a bus 7. The processor 1 comprises a secure context 5 and a user context 3, and will be described in more detail with respect to FIG. 3 below. The secure context 5 comprises a security controller 50. Also coupled to the bus 7 is a display interface 19, a random access memory (RAM) 15, a user input interface 17, a data storage 9, and a plurality of communication devices 21. The data storage 9 comprises both encrypted 11 and unencrypted 13 portions.

The plurality of communication devices 21 comprise a GSM chip 23 for communicating over a GSM network, a GPS chip 25 for detecting a GPS signal, and a wireless communications device 27 for coupling to a wireless communications network. The communication devices 21, and in particular the GSM chip 23 and/or wireless communications device 27, wirelessly couple to a remote device 29.

The components of the computer system are operable to communicate through the bus 7. A user may input information into the system through the user input interface 17 and interact with the system through display 19. The RAM 15 is operable to receive and temporarily store information sent from the processor 1 or from the data storage 9 for the operation of the computer system. Data storage 9 is operable to store data for operating the computer system and other data the user has created or received.

The communication devices 21 are operable to connect the system to a wireless network and gather information. One or more of these pieces of information gathered may be used by the processor 1 to formulate an identifier. The GSM chip 23 is operable to obtain information regarding the GSM cell the computing system is located in, and other GSM-related data, such as the IMEI number. The GPS chip 25 is operable to obtain geographical position information where a signal is available. The wireless communications device 27 is operable to couple the computer system to a wireless network and provides information such as the network identity or service set identification (SSID), MAC address and IP address.

The processor 1 is operable in the user context 3 and the secure context 5 by creating two virtual cores within the processor 1; a secure context virtual core and a user context virtual core. The processor 1 is operable to partition virtual memory between the secure context 5 and the user context 3.

The security controller 50 is operable to control access to data on the data storage 9 by controlling a map of the data storage 9. The security controller 50 can do this by selecting a map of data from at least two stored maps. Each map comprises an association between file names and storage addresses and represents a selection of data.

The security controller 50 is operable to perform the context switching by time slicing the processor 1 between the secure context 5 and the user context 3. The security controller 50 is configured to be operable in a secure application environment, separate from the operating system of the computer system. The security controller 50 is configured to operate within the secure context 5 of the processor, and context switch resources between the secure context 5 and the user context 3.

In operation, the computer system of FIG. 1, as described above, operates in a secure context 5 and a user context 3 through context switching controlled by the security controller 50. In order to control the accessibility of data on the data storage 9 to the computer processor 1, the processor 1 obtains an identifier through operation of the communication devices 21. The identifier is used to determine, amongst other information, the location of the computer system, the user and the time. The security controller 50 makes a determination in the secure context 5, dependent on the obtained identifier, whether to make a selection of the data accessible in the user context 3. If the security controller 50 determines that data is to be made accessible, it provides access in the user context 3 to the selection of data stored on the data storage 9.

The processor 1 provides this access to data by controlling a map of the data storage 9. The processor 1 does this by obtaining one of at least two maps representing a selection of data on the data storage 9. Specifically, the security controller 50 operating in the secure context 5 obtains and decrypts a map. Once a map has been obtained and decrypted, it is stored in the RAM 17 for use by the processor 1. By obtaining a map representing the selection of data to be made accessible, the processor 1 knows the storage addresses for the selected data on the data storage 9, and in this way the data on the data storage 9 is made accessible in the user context 3.

By obtaining a map of data on the data storage 9, only specific selections of data are made accessible when a certain map is obtained. These specific selections of data depend on the map obtained. In this way, the operating system in the user context 3 can only access specific selections of data at specific times and at specific locations, for example when a user is at work or not at work. For example, the operating system in the user context 3 can only access work data the computer system and/or a user are at a work location, as determined by the communication devices 21 and/or inputs via the user input interface 17. Operation of the system in this way also controls the accessibility of data on the data storage 9 to other computers or devices connected to the computer system by a network, for example the remote device 29. For example, a user's personal data are not made accessible to their employer when at work, because the operating system in the user context 3 cannot locate that data.

Figure 2:
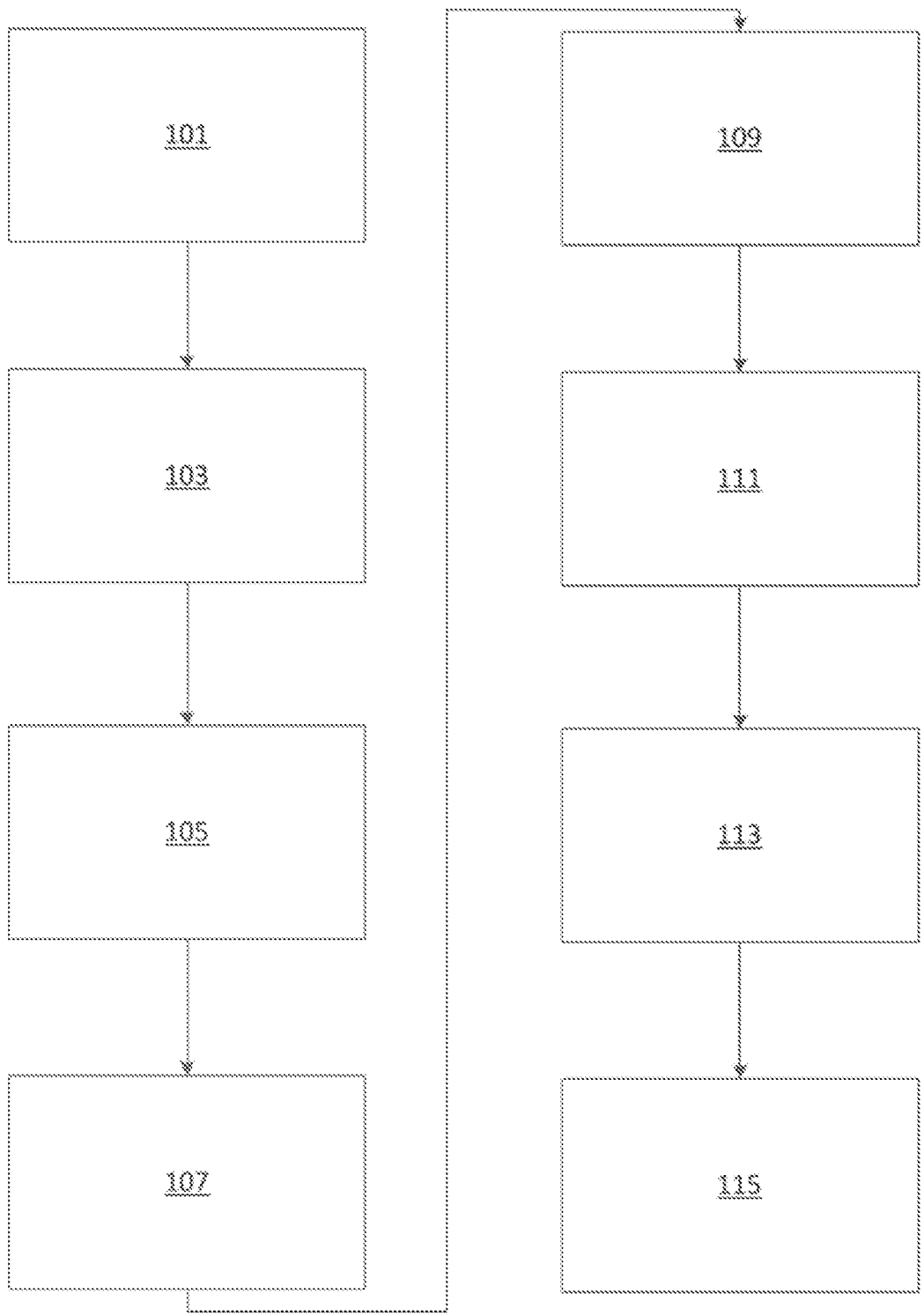
FIG. 2 shows a flow-chart representing a method for controlling the accessibility of data on the computer system of FIG. 1.

FIG. 2 shows a method of controlling the accessibility of data suitable for use with the computer system shown in FIG. 1.

The method comprises obtaining 101 an identifier by formulating an identifier based on information received such as the computer system's location, time and user, and/or other pieces of information. The identifier is then passed 103 to the security controller 50 operating in the secure context 5 of the processor 1. In the secure context 5, the security controller 50 determines 105, dependent on the identifier, whether to make data accessible in the user context 3. This allows the accessibility of data on the data storage 9 to be controlled.

Specifically, the security controller 50 running in the secure context 5 of the processor 1 controls the accessibility of data on the data storage 9. It does this by obtaining 107 a map of data from the data storage 9. The security controller 50 passes 109 the map to the RAM 15. When the security controller 50 receives 111 a request for data, the secure context 5 provides secure access to the data on the data storage 9 by decrypting 113 data on the data storage 9. The secure context 5 then makes the data available 115 to the user context 3.

Figure 3:
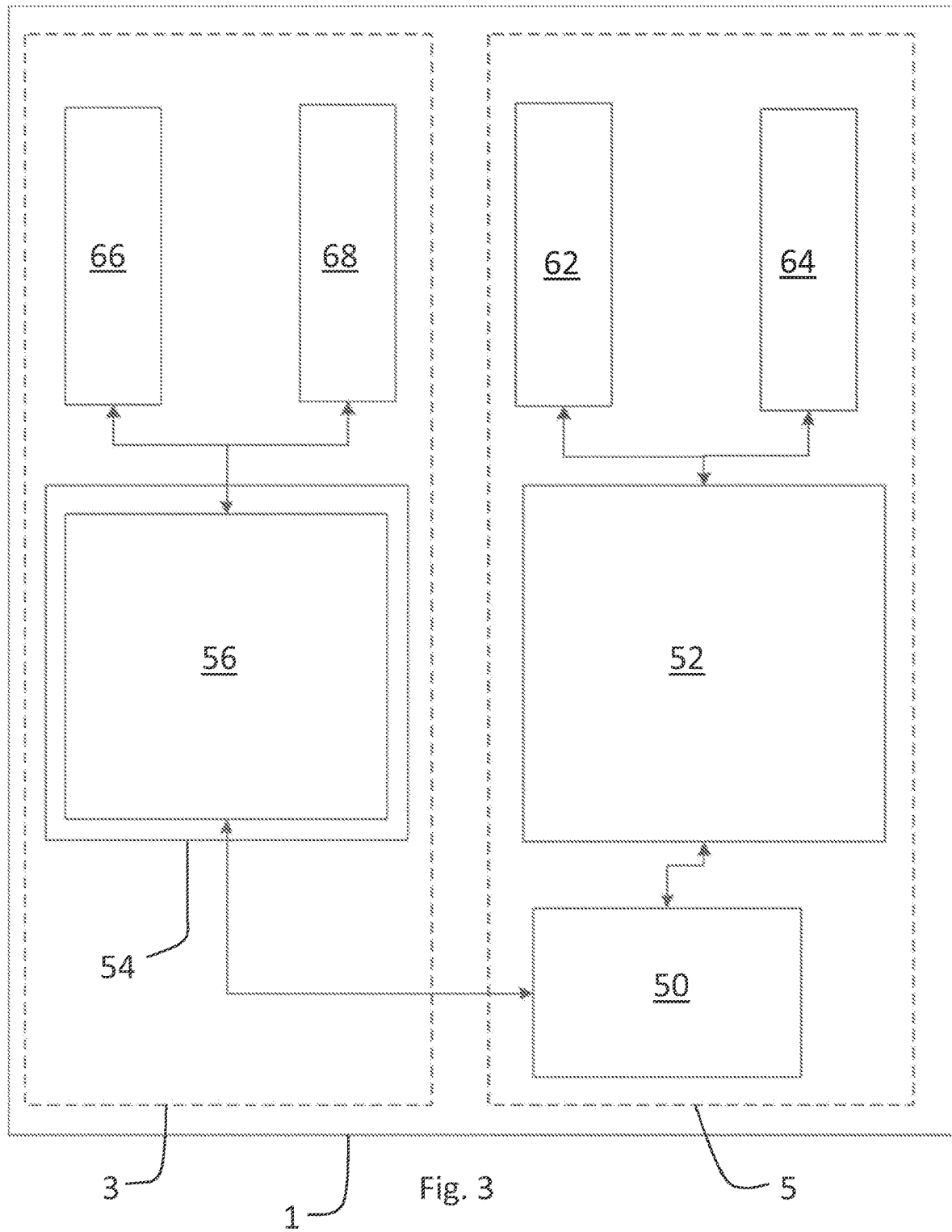
FIG. 3 shows a schematic of a computer processor suitable for use with the computer system of FIG. 1.
Figure 4:
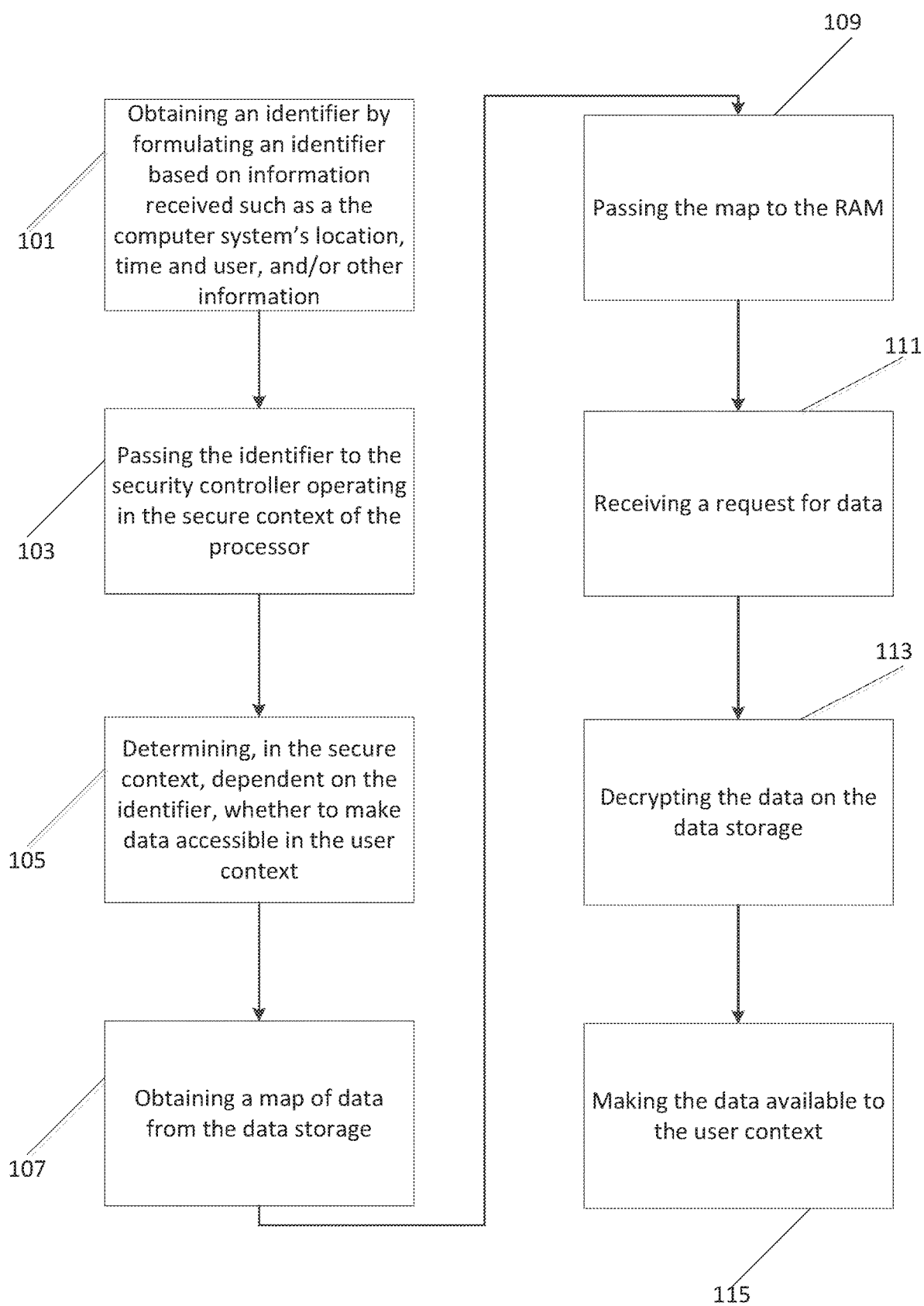
FIG. 4 is a flowchart of a method of controlling the accessiblity of data to a computer processor configured to context switch between a user context and a secure context, according to some embodiments of the present invention.

One example of a processor 1 suitable for use with the computer system of FIG. 1 is shown in detail in FIG. 3. The processor 1 is configured to be operable in two contexts, a user context 3 and a secure context 5. The secure context 5 comprises a security controller 50 coupled to a kernel 52. The secure context 5 further comprises a key 62 and a data accessibility provider 64 coupled to the kernel 52. The user context 3 comprises a kernel 54 comprising a context interface 56. The kernel 54 is coupled to the security controller 50 of the secure context 5. The user context 3 further comprises user applications 66 and an identifier interface 68 coupled to the kernel 54.

The processor 1 is configured to be operable in the two contexts by way of the kernel 52 of the secure context 5. The kernel 52 of the secure context 5 is configured to boot before the kernel 54 of the user context 3 boots. In this way, the secure context 5 is operable to be running before the user applications 66 (for example the operating system of the user context 3) boots. Although the processor 1 is operable in a secure context 5 and a user context 3, the user context 3 can still be operable to support multi-tasking and multi-threading. The context interface 56 of the user context 3 is operable to provide an interface for the user context 3 to communicate with the security controller 50 of the secure context 5.

The key 62 is an encryption key, and the data accessibility provider 64 is operable to use the key 62 to encrypt or decrypt data stored on the data storage 9. The data accessibility provider 64 is operable to use the key 62 to allow the processor 1 (operating in the secure context 5) to read and write data to the encrypted 11 and unencrypted 13 portions of the data storage 9. In this way, the secure context 5 is operable to provide secure access to data on the data storage 9. This is done by decrypting selections of the data.

The identifier interface 68 is operable to receive pieces of information from communication devices 21 and user input interface 17 to formulate an identifier. For example, the identifier interface 68 is operable to receive pieces of information regarding the time, the computer system, and a user identifier indicating a user currently operating the computer system. The identifier interface 68 is configured to receive these pieces of information and use them to formulate the identifier in the user context 3. The identifier interface 68 is configured to apply a weighting to the different pieces of information based on a determination by the identifier interface 68 of their reliability and/or security. The identifier interface 68 determines what weighting to apply to the pieces of information formulating the identifier by consulting a lookup table comprising an association between the source of the information and a weighting. The lookup table indicates the weighting to apply to the pieces of information formulating the identifier based on the source of each piece of information used to formulate the identifier, for example the user input interface 17 and communications devices 21.

The user applications 66 are operable to provide a way for a user to communicate with and interface with the computer system.

As described above, the computer processor 1 operates in a secure context 5 and a user context 3 and, in order to control the accessibility of data on the data storage 9, obtains an identifier. In operation, the identifier interface 68 determines the identifier and passes it from the identifier interface 68 operating in the user context 3 to the security controller 50 operating in the secure context 5. The security controller 50 verifies the identifier and determines whether to make data accessible based on the determination of the identifier.

The security controller 50 verifies the identifier by using the communications devices 21 and communicating with the remote device 29. This is done by sending a first network message based on the identifier from the security controller 50 operating in the secure context 5 of the processor 1, to the remote device 29. The message passes from the secure context 5 via the bus 7 to the wireless communications device 27. The remote device 29 processes the first network message and sends a second network message back to the computing system. This message is received by the wireless communications device 27 and passed via the bus 7 back to the security controller 50 operating in the secure context 5 of the processor 1. The security controller 50 receives the second network message and verifies the identifier based on the second network message received. In this way, the identifier is verified in the secure context 5 because the first and second network messages are processed by the security controller 50 operating in the secure context 5. Therefore the identifier effectively acts as a key to grant privileges (in this case accessibility of data) to the operating system in the user context 3, and so to a user operating the computer system.

The security controller 50 obtains a map of data stored on the data storage 9. The map obtained depends on the determination made by the security controller 50 at verification of the identifier. Obtaining the map comprises selecting one of the at least two stored maps. The selected map is passed to the RAM 15 for use by user applications 66 (for example the operating system of the user context 3) of the computer system.

To access data, the user applications 66 requests access to data identified by the map, and passes the request to the security controller 50. In this way, the request is passed from the user context 3 to the secure context 5, and the user context 3 can only access data represented by the map.

The security controller 50 passes the request to the data accessibility provider 64. The data accessibility provider 64 uses the key 62 to decrypt the selected data. The map obtained shows all data accessible to the operating system in the user context 3, and if any of this data is encrypted, it is only decrypted upon request to increase efficiency of the computer system. The decrypted data is then temporarily stored in the unencrypted portion 13 of the data storage 9. The security controller 50 receives data accessed from the data storage 9 by the data accessibility provider 64 and passes it to the user applications 66 operating in the user context 3.

By making data accessible to the operating system in the user context 3 in this way, a user can also control the accessibility of data that they record or create. For example, once a particular map is obtained, all data that the user creates or receives and records will be recorded to that specific map. Data is recorded whenever data (for example a file) is modified and the map is accordingly updated. The user applications 66 detect whenever the data is modified.

The identifier interface 68 will periodically check to ensure that the identifier grants sufficient privileges to the system to display the current map. If the identifier changes such that a different map should be obtained (for example, because the user leaves work taking the computer system with them), then the identifier interface 68 passes a message to the security controller 50 which results in the map changing.

In some configurations, the computer system is a laptop computer, a mobile phone or a tablet device. In some configurations the user input interface 17 comprises a keyboard and mouse. In some configurations the user input interface 17 comprises a touch screen and/or buttons. The user input interface 17 may comprise a microphone. In some configurations the computer system comprises a speaker. It will be apparent to the skilled person that in some embodiments, the components of the computer system may be coupled by other means than a bus 7.

In some configurations the computer system comprises only one communications device 21. In some configurations the data storage 9 is a non-volatile data storage, for example a hard disk drive (HDD), an optical disk, a magnetic tape, FLASH or EEPROM. In some configurations, the remote device 29 is a remote server. The remote server may be a computer system controlled by a network administrator.

In some configurations all hardware and software resources are available to the secure context 5, but limited hardware and software resources available to the user context 3.

In some configurations the computer system couples to a network using a fixed connection, for example by Ethernet. In some configurations the computer system connects to a plurality of remote devices or computers. In some configurations the computer system comprises a plurality of processors. In some configurations the user applications 66 operate with the Linux® operating system. However, it will be apparent to the skilled person that the computer system may operate with a variety of different operating systems. In some configurations, the secure context 5 is operable to provide a secure application environment or trusted execution environment (TEE). One example of a system operable to provide a secure context 5 and partition virtual memory and resources is TrustZone®.

In some configurations the identifier interface 68 is in the secure context 5. Therefore, in these configurations the identifier may be obtained in the secure context 5. This may increase the integrity and reliability of the identifier. In some configurations, the user applications 66 operate in the secure context 5. In these configurations the data to be made accessible may be made accessible only to the secure context 5. In some configurations, the user applications 66 obtain a map of the data storage 9. The user applications 66 may therefore determine whether to make data accessible whilst operating in the user context 3 or secure context 5.

In some configurations, operation of the system causes a request to access data on the data storage 9 to be passed to the security controller 50. For example, the process described with respect to FIG. 3 may begin when the computer system is powered on or when the operating system boots.

In some configurations, the processor 1 starts in the secure context 5 when it is powered on. This enables any sensitive security checks to run before any user context 3 applications, for example user applications 66, have an opportunity to modify any aspect of the system.

In some configurations, after power on, the processor 1 will start executing a ROM-based bootloader which is responsible for initialising critical peripherals such as memory controllers, before switching to a device bootloader located in external non-volatile storage (such as data storage 9 or RAM 15). The boot sequence will then progress through the secure context 5 initialising stages, before passing control to the user context 3 bootloader. This will progress to starting the user context 3 operating system (for example user applications 66), at which point the system can be considered running.

In some configurations, the same selection of data may be represented by different maps. In other configurations, different maps represent mutually exclusive selections of data. In some configurations, the security controller 50 makes a determination whether to make all the data on the data storage 9 accessible in the user context 3. In some configurations the security controller 50 makes a determination whether to make selections and/or all of the data on the data storage 9 accessible in the secure context 5.

In some configurations, the security controller 50 obtains a map by selecting a map from a plurality or subset of different predetermined maps. In some configurations, the security controller 50 selects more than one map. In some configurations the security controller 50 creates a new map based on the identifier. In some configurations the map is dependent on the age of data on the data storage 9. In some configurations, which map to obtain is predetermined by a user. In some configurations, the map is passed to the data storage 9 or a cache in the processor 1. In some configurations the maps are encrypted, or at least one map is encrypted. For example, a map representing a selection of work data is encrypted, while a map representing a selection of a user's personal data is unencrypted.

In some configurations, the maps are a file allocation table that indicate the directory structure of data on the data storage 9. In some configurations each map comprises information about the storage address of clusters on the data storage 9. In some configurations the storage address comprises information about the physical location of information on the data storage 9. In some configurations the map of the data storage 9 comprises at least one of a file allocation table, metafile data in a master file table, a master directory block, a volume bitmap, a catalog file, a resource fork, a volume header or an allocation file.

In some configurations only one map is available. In these configurations the data may have attributes that identifies the data in a different way. For example, the attributes may indicate under what conditions (as dependent on a determination of the identifier) the data is to be made accessible. Accordingly, in these configurations the map may be an attribute table.

In some configurations the data is files for use by the user applications 66. In some configurations, changing the map of the data storage 9 comprises changing the user environment in the user applications 66. For example, a user may have one desktop and operating settings for the computer system at work and a different desktop and operating settings when not at work.

In some configurations, the security controller 50 provides secure access to data on the data storage 9 by encryption. In some configurations the map obtained is encrypted. For example, the map may be decrypted by the secure context 5 (for example by the data accessibility provider 64 using key 62) and stored in the RAM 15 for use by the processor 1. In some configurations all the maps are encrypted. In some configurations, when a map is obtained that makes reference to at least some encrypted data, the computer system will decrypt all the encrypted data to an unencrypted portion 13 of the data storage 9. In some configurations, data that has been unencrypted for use is stored in the RAM 15.

In some configurations the security controller 50 continuously monitors the identifier to ensure that the correct map is obtained. In this way the map obtained may automatically change when the identifier changes resulting in a determination that a different map should be obtained. In some configurations a user will be notified of the requirement for the map to change so that the user has the opportunity to save their work before the map changes. In other configurations the map is not monitored during use and is only checked when the system boots. In some configurations a user has the opportunity to manually select a map to be obtained. For example, a user may be able to select both maps in one location but only one map at certain specified locations.

In some configurations a weighting is applied to the identifier itself. In some configurations, the determination of what data to be made accessible depends on the sum of the weighted pieces of information used to formulate the identifier. In some configurations the weighting applied to the pieces of information used to formulate the identifier, or a weighting applied to the identifier itself, is configurable by a user. Dependent on the weighted identifier, all data, only some data, or no data may be made accessible. In some configurations the weighting applied to the identifier is obtained without communicating with a server. In some configurations no weighting is applied to the identifier and/or to pieces of information used to formulate the identifier.

In some configurations controlling the accessibility of data recorded by a computer comprises determining whether data is to be recorded to a data storage according to one of a plurality of different maps. In some configurations recording data to a data storage comprises creating a map.

In some configurations, all data recorded or created under a specific map is encrypted whilst all data recorded or created under another map is not encrypted. In some configurations the data is encrypted by the secure context 5. In some configurations the data is encrypted through use of TrustZone®. In some configurations data is encrypted by the data storage 9. In some configurations all data on the data storage 9 is encrypted. In some configurations no data on the data storage 9 is encrypted, and the data storage 9 only has an unencrypted portion 13.

In some configurations data created on the computer system is only recorded on the data storage 9 when manually selected by a user. For example, the user may have to press a button within the user applications 66 to record data to the data storage 9. In some configurations data created on the computer system is only recorded to the encrypted portion 11 of the data storage 9 when selected by a user. For example, a default setting may be that all data created is recorded on the unencrypted portion 13 of the data storage 9. In some configurations data created on the computer system is recorded to the data storage 9 automatically when a different map is obtained.

Although the description above has related to the operation of a processor to control access to, and mapping of, data storage, in an embodiment there is also provided a removable data storage device comprising an interface for coupling to a host computer, a data store, and a data store controller coupled between the interface and the data store, wherein the controller is configured to obtain an identifier and to select a map of the data store based on the identifier and to provide the map to the host computer to enable the host computer to access data stored on the data store.

The controller may determine whether or not to provide access, and in the event that access is to be provided, the controller may select the map dependent on the identifier. The identifier may be determined according to any one or more of the methods described herein. In an embodiment the memory storage device comprises a communication interface for obtaining pieces of information to be used to formulate the identifier (e.g. the SSID of a network, location information such as a GPS location, a date and or time, a GSM cell identifier, or any of the other kinds of information described above).

The controller may be configured to decrypt the selected map, and to decrypt data identified by the selected map in response to a request from the host computer. The map may comprise an association between locations of data in the data store and file names or identifiers.

The interface may comprise a USB interface, or a wireless interface provided by a protocol such as Bluetooth (RTM), a WIFI (RTM) interface, or an Near-field RF communications protocol or any other kind of communication interface. The removable memory device may comprise a housing, adapted to encapsulate the data store and the controller.

What is claimed is:

1. A method of controlling the accessibility of data to a computer processor configured to context switch between a user context and a secure context, the method comprising:
   obtaining an identifier;
   determining dependent on the identifier, in the secure context, whether to make data accessible in the user context; and,
   in the event that it is determined to make data accessible, controlling a map of data storage to provide access to the data in the user context according to a selected map, wherein controlling a map of data storage comprises choosing between at least two pre-stored maps of the data storage based on the identifier to choose the selected map, wherein each said map of data storage comprises an association between a plurality of file names and a corresponding plurality of storage addresses;
   wherein the selected map is made available to applications in the user context to enable the applications to use the selected map to request access to data identified by the map, wherein in the event that data requested by the applications comprises encrypted data, the encrypted data is decrypted in the secure context to provide unencrypted data to the applications in the user context.

2. The method of claim 1 wherein determining dependent on the identifier comprises passing the identifier to a security controller operating in the secure context of the computer processor, and the security controller determining dependent on the identifier, in the secure context, whether to make data accessible in the user context.

3. The method of claim 1 wherein data is selected in the secure context.

4. The method of claim 1 wherein obtaining the identifier comprises obtaining the identifier in the user context and passing the identifier from the user context to the secure context.

5. The method of claim 1 wherein obtaining the identifier comprises obtaining the identifier in the secure context.

6. The method of claim 1 wherein the identifier is verified in the secure context.

7. The method of claim 1 wherein the processor has a core configured to provide a secure context virtual core and a user context virtual core, and the secure context operates in the secure context virtual core and the user context operates in the user context virtual core.

8. The method of claim 1 wherein hardware and/or software resources are partitioned between the secure context and the user context.

9. The method of claim 1 comprising sending a first network message based on the identifier from the processor operating in the secure context to a remote device, wherein determining dependent on the identifier comprises determining based on a second network message received from the remote device.

10. The method of claim 1 wherein the identifier comprises at least one of: time information, GPS information, host computer information, a MAC address, an IP address, a wireless network ID, SSID, GSM cell, GSM data, a user identifier indicating a user currently operating the host computer, and one or more unique identifiers to prevent spoofing or false reporting from the host computer.

11. The method of claim 1 wherein a weighting is applied to the identifier dependent on the source of the identifier, the weighted identifier being used to determine the accessibility of the data.

12. The method of claim 11 wherein the weighting is determined by a lookup table indicating the weighting to apply to an identifier based on its source.

13. The method of claim 1, wherein controlling a map of data storage comprises controlling an association between file names and addresses which comprises changing the directory structure of the data storage.

14. A method of controlling the accessibility of data to a computer processor, the method comprising:

obtaining an identifier;

passing the identifier to a security controller operating in the computer processor;

the security controller determining dependent on the identifier, whether to make data accessible; and dependent on the determination of the identifier, the security controller controlling the accessibility of data on a data storage coupled to the processor by controlling a map of the data storage, wherein controlling a map of data storage comprises choosing between at least two pre-stored maps of the data storage based on the identifier wherein each said map of data storage comprises an association between a plurality of file names and a corresponding plurality of storage addresses;

wherein the selected map is made available to user applications to enable the user applications to use the selected map to request access to data identified by the map, wherein in the event that data requested by the applications comprises encrypted data, the encrypted data is decrypted by the security controller to provide unencrypted data to the user applications.

15. The method of claim 14 comprising sending a first network message based on the identifier to a remote device, wherein determining dependent on the identifier comprises determining based on a second network message received from the remote device.

16. A non-transitory computer readable storage medium comprising a program for a computer configured to cause a processor to obtain an identifier;

determine dependent on the identifier, in the secure context, whether to make data accessible in the user context; and, in the event that it is determined to make data accessible, control a map of data storage to provide access to the data in the user context, wherein controlling a map of data storage comprises choosing between at least two pre-stored maps of the data storage based on the identifier wherein each said map of data storage comprises an association between a plurality of file names and a corresponding plurality of storage addresses;

wherein the selected map is made available to user applications to enable the user applications to use the selected map to request access to data identified by the map, wherein in the event that data requested by the applications comprises encrypted data, the encrypted data is decrypted by the security controller to provide unencrypted data to the user applications.

* * * * *